United States Patent [19]

Watanabe

[11] Patent Number: 4,467,601
[45] Date of Patent: Aug. 28, 1984

[54] METHOD AND A SYSTEM FOR CONTROLLING A SOOT CATCHER PURGING THROTTLE VALVE

[75] Inventor: Noboru Watanabe, Susono, Japan

[73] Assignee: Toyota Jidosha Kabushiki Kaisha, Toyota, Japan

[21] Appl. No.: 409,835

[22] Filed: Aug. 20, 1982

[30] Foreign Application Priority Data

Sep. 18, 1981 [JP] Japan .................. 56-148277

[51] Int. Cl.³ ............................ F01N 3/02; F01N 3/22
[52] U.S. Cl. .............................. 60/274; 60/285; 60/311; 123/376; 123/399; 123/403
[58] Field of Search ................. 60/274, 285, 311; 123/341, 376, 399, 400, 401, 403

[56] References Cited

U.S. PATENT DOCUMENTS

| | | | |
|---|---|---|---|
| 436,355 | 6/1943 | Bonnier | 123/401 |
| 3,548,798 | 12/1970 | Fleischer | 123/379 |
| 4,211,075 | 7/1980 | Ludecke | 60/311 |

Primary Examiner—Douglas Hart
Attorney, Agent, or Firm—Oblon, Fisher, Spivak, McClelland & Maier

[57] ABSTRACT

A diesel engine is provided with an air throttle valve fitted in its intake system, which when operated to provide throttling action decreases the air flow in the intake system of the engine and increases the temperature of the exhaust gases of the engine, in order to heat up a soot particle catcher fitted to the exhaust system which thus is purged by combusting the accumulation of soot particles in it. When the air throttle valve is thus throttling the intake system and thus raising the temperature of the exhaust gases so as to purge the soot particle catcher, the amount of throttling provided by the air throttle valve is controlled, by comparing the pressure in the intake system downstream of the air throttle valve with a certain reference pressure, so as to keep this pressure in the intake system downstream of the air throttle valve substantially the same as this reference pressure.

3 Claims, 3 Drawing Figures

METHOD AND A SYSTEM FOR CONTROLLING A SOOT CATCHER PURGING THROTTLE VALVE

BACKGROUND OF THE INVENTION

The present invention relates to a method and a system for control of an intake air throttling valve fitted to the intake manifold of a diesel internal combustion engine, and, more particularly, relates to a method and a system for control of an intake air throttling valve fitted to the intake manifold of a diesel internal combustion engine, for throttling down the flow of air into the combustion chambers through said intake manifold of the engine, in order to raise the temperature of the exhaust gases of the engine so as to purge or rejuvenate a soot particle catcher of a per se well known sort fitted to the exhaust system of the engine by heating said particle catcher up and by combusting a soot particle accumulation in said soot particle catcher by igniting it by heating it by said raised temperature of said exhaust gases of the engine.

Nowadays, it is common and conventional to provide a soot particle catcher to the exhaust system of a diesel engine. Such a soot particle catcher catches and accumulates carbon particles and other solid particles present in the exhaust gases of the diesel engine, and prevents their escape to the atmosphere. Since it is becoming more and more understood nowadays that fine soot particles such as carbon particles may present a significant health hazard to the public, the provision of such a soot particle catcher to the exhauat system of a diesel engine is very important from the environmental and public health point of view.

Such a soot particle catcher normally has a filter like structure for catching the soot particles, and as a matter of course this filter structure inevitably tends to become clogged up, over a long period of use of the soot particle catcher, with an accumulation of soot particles, chiefly carbon particles. When this happens, not only does the efficiency of the soot particle catcher for purifying the exhaust gases of the diesel engine of soot particles drop drastically, but also the resistance of the soot particle catcher to the flow therethrough of exhaust gases increases, which deteriorates the actual operation of the diesel engine, causing its breathing efficiency to drop, which causes a loss of engine power. This has presented a serious problem with regard to such a soot particle catcher; either it has been necessary to regularly remove the soot particle catcher in order to cleanse it of soot particles which have become accumulated therein, requiring dirty, expensive, and troublesome works; or some system has had to be provided for cleaning or purging or rejuvenating the soot particle catcher in situ, without removing said soot particle catcher from the engine.

One way in which it is possible to purge or rejuvenate such a soot particle catcher is by burning out the combustible soot particles such as carbon particles which are clogging the filter structure of the soot particle catcher by increasing the temperature of the exhaust gases passing through the soot particle catcher above the ignition temperature of said combustible soot particles. This is possible and practicable because the filter element which traps said soot particles may typically be constructed of a refractory material which is substantially unaffected during such combustion.

During operation of the diesel engine, when the load on the diesel engine rises to a high load level wherein the excess air ratio in the exhaust gases becomes small, it is quite possible for the temperature of the exhaust gases passing through the filter structure of the soot particle catcher to spontaneously rise above the ignition temperature of the soot particles clogging the soot particle catcher, without the provision of any special means for raising the temperature of said exhaust gases. In this case, purging or rejuvenating of the soot particle catcher as described above may spontaneously occur, by burning out said soot particles lodged therein as a clogging accumulation. However, this spontaneous self purging or rejuvenating process cannot be relied upon. Diesel engines, especially in automotive vehicles, are only irregularly operated in high load conditions; and when an automotive vehicle is being operated in urban traffic it is quite unusual for the diesel engine thereof to be operated in the high load operational region. Thus such spontaneous self purging or rejuvenating of a soot particle catcher, if relied upon, might not occur in time to purge or rejuvenate the soot particle catcher before its clogging had unacceptably deteriorated the functioning of the diesel engine to which it was fitted. Therefore, if this form of purging the soot particle catcher by burning out the soot particles accumulated therein is to be practiced, it is necessary to practice some particular special and reliable method for raising the temperature of the exhaust gases of the diesel engine to a temperature higher than the ignition temperature of the soot particles which are becoming lodged in the soot catcher thereof, in order reliably to purge or rejuvenate said soot particle catcher whenever it becomes clogged.

As per se well known prior art method for raising the temperature of the exhaust gases of a diesel engine to a tempearture higher than the ignition temperature of the soot particles which are becoming lodged in the soot particle catcher thereof in order to purge or rejuvenate said soot particle catcher has been to reduce the amount of excess air which is being supplied to the combustion chambers of the diesel engine during operation of said diesel engine, by limiting the air intake of the engine. This raises the temperature of the exhaust gases of the engine because the hot gases produced by combustion of the fuel which is injected into the combustion chambers of said engine to be burnt therein is mixed with a lesser amount of cool air, i.e. of excess air.

This limiting of the air intake of the diesel internal combustion engine has been heretofore implemented by the provision of an intake air throttling valve at an intermediate position in the air intake passage, or the air intake manifold, of the diesel engine. When it is decided that the soot particle catcher requires to be purged or rejuvenated by raising the temperature of the exhaust gases passing therethrough to higher than the ignition temperature of the carbon particles lodged therein, so that the intake air throttling valve is required to be positioned to its position in which it substantially throttles the flow of air through the intake manifold in order thus to heat up the temperature of the exhaust gases, and then the air pressure in the air intake manifold of the diesel engine downstream of this intake air throttling valve becomes as a matter of course depressed below atmospheric pressure. In this case, if this throttling of the air intake passage is performed to too great an extent, then the operability of the diesel engine is severely deteriorated, its performance and power output suffer, and the drivability of a vehicle incorporating said diesel internal combustion engine will become poor. In particular, there is a risk of misfiring of the diesel internal combustion engine, if said depression in the air intake manifold of the diesel engine downstream of said intake air throttling valve becomes too great. Further, when the depression in the intake manifold is too large, this can cause emission of quantities of black smoke in the exhaust of the diesel internal combustion engine. This of course is quite unacceptable on environmental grounds, and in view of the standards for control of noxious emissions in the exhaust gases of internal combustion engines for vehicles, which are becoming more and more severe nowadays. In this regard, the inventor of the present invention has found, through investigations of operation of the diesel internal combustion engines under the throttling of the flow of air through the intake manifold in order to raise the temperature of the exhaust gases, that if the depression in the air intake manifold of the diesel engine downstream of said intake air throttling valve is held not to be greater than some certain predetermined value (the actual value of which depends upon the design of the diesel internal combustion engine), irrespective of the load on and the revolution speed of the engine, the abovementioned troubles caused by the limitation of the intake air flow can be clearly avoided.

SUMMARY OF THE INVENTION

Accordingly, it is the primary object of the present invention to provide a method, and a device for implementing said method, for controlling an air throttling valve which is used for throttling the air intake system of a diesel internal combustion engine for causing the temperature of the exhaust gases of said diesel engine to rise in order to purge or rejuvenate a soot particle catcher fitted to said engine, which can reliably and properly cause said raising of the temperature of said exhaust gases, without causing any problems of over throttling of said intake system of the engine.

It is a further object of the present invention to provide a method, and a device for implementing said method, for controlling an air throttling valve which is used for throttling the air intake system of a diesel internal combustion engine for causing the temperature of the exhaust gases of said diesel engine to rise in order to purge or rejuvenate a soot particle catcher fitted to said engine, which do not deteriorate the performance of the diesel engine.

It is a further object of the present invention to provide a method, and a device for implementing said method, for controlling an air throttling valve which is used for throttling the air intake system of a diesel internal combustion engine for causing the temperature of the exhaust gases of said diesel engine to rise in order to purge or rejuvenate a soot particle catcher fitted to said engine, which do not deteriorate the operability of the diesel engine.

It is a further object of the present invention to provide a method, and a device for implementing said method, for controlling an air throttling valve which is used for throttling the air intake system of a diesel internal combustion engine for causing the temperature of the exhaust gases of said diesel engine to rise in order to purge or rejuvenate a soot particle catcher fitted to said engine, which do not deteriorate the power output of the diesel engine.

It is a further object of the present invention to provide a method, and a device for implementing said method, for controlling an air throttling valve which is used for throttling the air intake system of a diesel internal combustion engine for causing the temperature of the exhaust gases of said diesel engine to rise in order to purge or rejuvenate a soot particle catcher fitted to said engine, which do not unduly deteriorate the breathing of the diesel engine.

It is a further object of the present invention to provide a method, and a device for implementing said method, for controlling an air throttling valve which is used for throttling the air intake system of a diesel internal combustion engine for causing the temperature of the exhaust gases of said diesel engine to rise in order to purge or rejuvenate a soot particle catcher fitted to said engine, which do not deteriorate the drivability of a vehicle to which the diesel engine is fitted.

It is a further object of the present invention to provide a method, and a device for implementing said method, for controlling an air throttling valve which is used for throttling the air intake system of a diesel internal combustion engine for causing the temperature of the exhaust gases of said diesel engine to rise in order to purge or rejuvenate a soot particle catcher fitted to said engine, which are not liable to the possibility of providing too much depression in the intake manifold of said diesel engine downstream of said air throttling valve, when said soot particle catcher is being purged or rejuvenated.

It is a further object of the present invention to provide a method, and a device for implementing said method, for controlling an air throttling valve which is used for throttling the air intake system of a diesel internal combustion engine for causing the temperature of the exhaust gases of said diesel engine to rise in order to purge or rejuvenate a soot particle catcher fitted to said engine, which can ensure sufficient raising of the temperature of said exhaust gases to reliably purge and rejuvenate said soot particle catcher.

It is a further object of the present invention to provide a method, and a device for implementing said method, for controlling an air throttling valve which is used for throttling the air intake system of a diesel internal combustion engine for causing the temperature of the exhaust gases of said diesel engine to rise in order to purge or rejuvenate a soot particle catcher fitted to said engine, which are not liable to the possiblity of causing substantial emissions of black smoke in the exhaust of the diesel engine during rejuvenation or purging of said particle catcher.

It is a further object of the present invention to provide a method, and a device for implementing said method, for controlling an air throttling valve which is used for throttling the air intake system of a diesel internal combustion engine for causing the temperature of the exhaust gases of said diesel engine to rise in order to purge or rejuvenate a soot particle catcher fitted to said engine, which are not liable to the possiblity of causing misfiring of the diesel engine during rejuvenation or purging of said particle catcher.

It is a further object of the present invention to provide a method, and a device for implementing said method, for controlling an air throttling valve which is used for throttling the air intake system of a diesel internal combustion engine for causing the temperature of the exhaust gases of said diesel engine to rise in order to purge or rejuvenate a soot particle catcher fitted to said engine, which are not liable to the possibility of causing the depression in the intake system of the diesel engine during rejuvenation or purging of said particle catcher to drop below a certain critical value.

According to the present invention, these and other objects relating to a method, and others, are accomplished by, for a diesel internal combustion engine comprising an exhaust system including a soot particle catcher, an intake manifold, and an air throttle valve positioned at an intermediate point in said intake manifold for throttling the flow of air through said intake manifold at said intermediate point in said intake manifold and for raising the temperature of the exhaust gases flowing through said exhaust system so as to purge said soot particle catcher: a method for controlling said throttle valve, wherein the pressure in said intake manifold at a point downstream of said intake throttle valve is sensed, and then said throttle valve is so controlled as to keep said pressure in said intake manifold at said point downstream of said intake throttle valve substantially at a predetermined target pressure.

According to such a method, because said pressure at said point in said intake manifold downstream of said intake throttle valve is kept substantially at said predetermined target pressure, which should be approximately the minimum pressure in the intake manifold at which it can be relied upon that the diesel internal combustion engine will not misfire, emit quantities of noxious black smoke, or suffer from poor drivability, therefore it is possible to rejuvenate and purge the soot particle catcher with high efficiency, because the intake throttle valve is used to a high degree of throttling to provide a high level of depression in the intake manifold of the engine for heating up the exhaust gases to perform said rejuvenation and purging, without running any risks such as the above mentioned ones. Accordingly the danger of reducing the breathing ability of the diesel internal combustion engine to below the safe level, and of consequent loss of performance and power thereof, is positively avoided. Thus the drivability of a vehicle including the diesel internal combustion engine is promoted, and the quality of its exhaust emissions during rejuvenation of the soot particle catcher is enhanced.

Further, according to a particular method aspect of the present invention, these and other objects are more particularly and concretely accomplished by such a method as described above, wherein said control is a form of feedback control.

According to such a method, this control may be thus advantageously performed in a feedback manner, which provides a form of error correcting control, as opposed to the function of a dead reckoning type control.

Further, according to the most general device aspect of the present invention, these and other objects relating to a device, and others, are accomplished by, for a diesel internal combustion engine comprising an exhaust system including a soot particle catcher, an intake manifold, and an air throttle valve positioned at an intermediate point in said intake manifold for throttling the flow of air through said intake manifold at said intermediate point in said intake manifold and for raising the temperature of the exhaust gases flowing through said exhaust system so as to purge said soot particle catcher: a system for controlling said throttle valve, comprising: (a) a sensor which senses the pressure in said intake manifold at a point downstream of said intake throttle valve; and (b) a control device which controls said throttle valve so as to keep said pressure in said intake manifold at said point downstream of said intake throttle valve and sensed by said sensor substantially at a predetermined target pressure.

According to such a structure, because said control device keeps said pressure at said point in said intake manifold downstream of said intake throttle valve substantially at said predetermined target pressure, which should be approximately the minimum pressure in the intake manifold at which it can be relied upon that the diesel internal combustion engine will not misfire, emit quantities of noxious black smoke, or suffer from poor drivability, therefore it is possible to rejuvenate and purge the soot particle catcher with high efficiency, because the intake throttle valve is used to a high degree of throttling to provide a high level of depression in the intake manifold of the engine for heating up the exhaust gases to perform said rejuvenation and purging, without running any risks such as the above mentioned ones. Accordingly the danger of reducing the breathing ability of the diesel internal combustion engine to below the safe level, and of consequent loss of performance and power thereof, is positively avoided. Thus the drivability of a vehicle including the diesel internal combustion engine is promoted, and the quality of its exhaust emissions during rejuvenation of the soot particle catcher is enhanced.

Further, according to a particular device aspect of the present invention, these and other objects are more particularly and concretely accomplished by such a system as described above, wherein said control performed by said control device is a form of feedback control.

According to such a structure, the control device may thus perform this control advantageously in a feedback manner, which provides a form of error correcting control, as opposed to the function of a dead reckoning type control.

BRIEF DESCRIPTION OF THE DRAWINGS

The present invention will now be shown and described with reference to the preferred embodiment thereof, and with reference to the illustrative drawings. It should be clearly understood, however, that the description of the embodiment, and the drawings, are all of them given purely for the purposes of explanation and examplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENT

Figure 1:
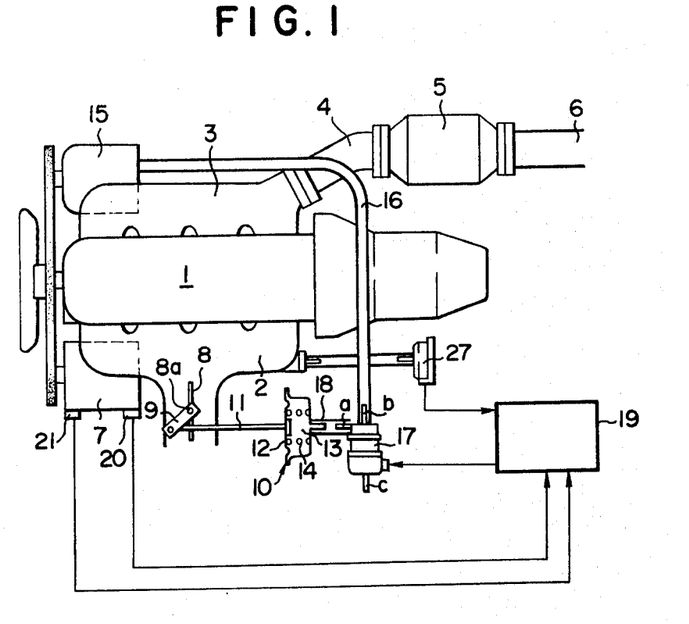
FIG. 1 is a schematic structural plan view, in part sectional form, showing a diesel engine, incorporating a soot particle catcher and an intake air throttling valve for increasing the exhaust gas temperature and purging and rejuvenating the soot particle catcher, which is equipped with the preferred embodiment of the intake air throttle valve control system according to the present invention, for practicing the preferred embodiment of the intake air throttle valve control method according to the present invention.

The present invention will now be described with reference to the preferred embodiment thereof, and with reference to the appended drawings. FIG. 1 is a schematic plan structural view, showing a diesel engine incorporating a soot particle catcher and an intake air throttling valve for increasing the exhaust gas temperature and purging and rejuvenating the soot particle catcher, which is equipped with the preferred embodiment of the intake air throttle valve control system according to the present invention, for practicing the preferred embodiment of the intake air throttle valve control method according to the present invention. In this figure, the reference numeral 1 generally denotes the diesel internal combustion engine, which is exemplarily a four cylinder in line type diesel engine. The crankcase of this diesel engine 1 is formed with an internal crankcase space and with a plurality of cylinder bores which cannot be seen in the drawing. In these cylinder bores there reciprocate pistons, which are pivotally attached to connecting rods which are in their turn pivotally attached to a crankshaft of the diesel engine 1 which is received in said internal crankcase space, and combustion chambers are defined above the pistons and below a cylinder head of the diesel internal combustion engine 1; none of these arrangements are particularly shown because they are well known per se and conventional. Further, to each of these combustion chambers there is provided a fuel injection valve, also not shown, of a per se well known sort appropriate to a diesel engine, each of which is mounted to the cylinder head so as to inject, in the form of a fine spray, pulses of diesel fuel under high pressure into its combustion chamber, at appropriate timing instants during the operation of the shown diesel internal combustion engine 1. These pulses of diesel fuel are supplied at these appropriate timing instants to the various fuel injection valves by a fuel injection pump 7 of a per se well known sort, in a per se well known way, the magnitude of each of said pulses of injected diesel fuel being varied according to the depression of an accelerator pedal or the like of the vehicle incorporating this diesel internal combustion engine 1, and said magnitude of said pulses determining the load on the diesel internal combustion engine 1.

The combustion chambers of the diesel internal combustion engine 1 are each provided with an intake port, not in the figure, which is controlled with regard to its opening and closing by an intake poppet valve also not particularly shown, and each combustion chamber is also provided with an exhaust port which is controlled with regard to its opening and closing by an exhaust poppet valve. Each of these poppet valves is actuated in a per se well known way, as by a valve rocker arm operated by a so called overhead camshaft mounted to the upper surface of the cylinder head of the diesel internal combustion engine 1, or the like.

Exhaust gases are exhausted from the combustion chambers of the diesel engine 1 via the exhaust ports into an exhaust manifold 3, which is communicated in-turn to an exhaust pipe 4 which leads to the inlet side of a soot particle catcher 5, the outlet side of which is connected to a second exhaust pipe 6 which leads to the atmosphere. The soot particle catcher 5 is of the above described per se well known sort, which incorporates a filter structure for catching the soot particles present in the exhaust gases passing therethrough; but which is however somewhat prone to becoming clogged up after a long period of service. In more detail, the soot particle catcher 5 is adapted to catch the combustible solid particles such as carbon particles present in the exhaust gases passing therethrough, while allowing substantially free flow of said exhaust gases therethrough. Such a soot particle catcher 5 may comprise a filter structure including a multi screen element which is made of ceramic or metal held within a casing of stainless steel or other heat resistant material able to withstand the temperature of the hot exhaust gases passing through the soot particle catcher 5. It is generally preferable to coat such a multi screen element with a catalyst for catalyzing the combustion of whatever combustible materials may be present in the exhaust gases.

This diesel internal combustion engine 1 is designed to suck in air into its combustion chambers from the atmosphere along the following path in the specified order: from the atmosphere into an air cleaner (not shown in the drawing); from said air cleaner into the upstream end of an intake manifold 2; along said intake manifold 2 past an air throttle valve 8 which will be described shortly, said air throttle valve 8 being mounted at an intermediate position in said intake manifold 2; and then along and out of a downstream part of the intake manifold 2, said downstream part being branched and being adapted to distribute the air between said combustion chambers of the diesel internal combustion engine 1.

The air throttle valve 8 which is mounted at said intermediate position within said intake manifold 2 is, in the shown exemplary construction utilizing the preferred embodiment of the intake air throttle valve control system according to the present invention for practicing the preferred embodiment of the intake air throttle valve control method according to the present invention, constructed as a butterfly valve which is supported on a valve shaft 8a which is pivotally mounted across the central portion of the intake manifold 2 at said intermediate position therealong. To this valve shaft 8a there is fixed one end of a lever arm 9, the other end of which is pivotally attached to the end of an actuating rod 11, the other end of which is connected to the diaphragm 12 of a diaphragm device 10.

The arrangement is such that when the diaphragm chamber 13 of the diaphragm device 10 is not supplied with any vacuum at all then a compression coil spring 14 located within said diaphragm chamber 13 biases the diaphragm 12 thereof and the actuating rod 11 and the lever arm 9 attached thereto in the leftward direction as seen in the figure, so as to position the valve shaft 8a and the air throttle butterfly valve 8 attached thereto to their positions as seen in the figure, in which no substantial throttling is provided for the intake manifold 2 by the air throttle valve 8. On the other hand, when the diaphragm chamber 13 of the diaphragm device 10 is supplied with vacuum of the maximum vacuum value, then this vacuum in said diaphragm chamber 13, against the biasing action of the compression coil spring 14 which is overcome, biases the diaphragm 12 of said diaphragm device 10 and the actuating rod 11 and the lever arm 9 attached thereto to their maximum possible amounts in the rightward direction as seen in the figure, so as to rotate to the maximum amount in the counterclockwise direction as seen in the figure the valve shaft 8a and the air throttle butterfly valve 8 attached thereto to air throttling positions thereof in which substantial throttling is provided for the air flowing through the intake manifold 2 by the air throttle valve 8. Further, when the diaphragm chamber 13 of the diaphragm device 10 is supplied with vacuum of an intermediate vacuum value, then this vacuum in said diaphragm chamber 13, against the biasing action of the compression coil spring 14 which is somewhat overcome according to the magnitude of this intermediate vacuum value, biases the diaphragm 12 of said diaphragm device 10 and the actuating rod 11 and the lever arm 9 attached thereto somewhat in the rightward direction as seen in the figure, so as to somewhat rotate the valve shaft 8a and the air throttle butterfly valve 8 attached thereto in the counterclockwise direction as seen in the figure to air throttling positions thereof in which an amount of throttling according to the magnitude of this intermediate vacuum value is provided for the air flowing through the intake manifold 2 by the air throttle valve 8.

The diaphragm chamber 13 of the diaphragm device 10 is provided with actuating vacuum of an appropriate vacuum value by a control system which will now be described. A vacuum pump 15 is provided to said diesel internal combustion engine 1 and is driven from the crankshaft thereof by the same belt as drives the fuel injection pump 7, so that the vacuum pump 15 is arranged to generate a continuous supply of vacuum whenever the diesel internal combustion engine 1 is running. The vacuum thus generated by this vacuum pump 15 is fed via a vacuum conduit 16 to an electrically actuated two way switching valve 17. The electrically actuated two way switching valve 17 is of a per se well known type including (for example) a solenoid and having three ports, designated as "a," "b," and "c" in the figure. When said solenoid is supplied with actuating electrical energy, the ports "a" and "b" are communicated together while the port "c" is not communicated to any other port of said electrically actuated two way switching valve 17; but, on the other hand, when said solenoid is not supplied with actuating electrical energy, the ports "a" and "c" are communicated together while the port "b" is not communicated to any other port of said electrically actuated two way switching valve 17. This solenoid of the electrically actuated two way switching valve 17 is selectively supplied with actuating electrical energy by an electrical control device 19 which will be described later with regard to its function. In fact, the electrical control device 19 alternatingly supplies actuating electrical energy to said electrically actuated two way switching valve 17, with a certain duty ratio; and thus said electrically actuated two way switching valve 17 is repeatedly and rapidly opened and closed with a duty ratio of opening and closing corresponding to the duty ratio of said electrical pulse signal output by the electrical control device 19. That is to say, the proportion of time that the port "a" of the electrically actuated two way switching valve 17 is communicated to the port "b" thereof corresponds to said duty ratio of said electrical pulse signal supplied thereto by the electrical control device 19, said duty ratio being defined as the proportion of time that said electrical pulse signal assumes an ON value. The port "a" of the electrically actuated two way switching valve 17 is communicated to the diaphragm chamber 13 of the diaphragm device 10 via a vacuum conduit 18; the port "b" of the electrically actuated two way switching valve 17 is communicated via the vacuum conduit 16 to the aforesaid vacuum pump 15; and the port "c" of the electrically actuated two way switching valve 17 is communicated directly to the atmosphere. Therefore, the value of the vacuum provided to said diaphragm chamber 13 of the diaphragm device 10 is determined to be greater or less, according as the duty ratio of said electrical pulse signal outputted by the electrical control device 19 to the electrically actuated two way switching valve 17 is greater or less, and corresponds to and is determined by the current value of said duty ratio. Accordingly, further, the greater is the duty ratio of said electrical pulse signal outputted by the electrical control device 19 to the electrically actuated two way switching valve 17, the greater is the amount of throttling provided for the intake manifold 2 of the diesel internal combustion engine 1 by the intake throttle valve 8, and the greater is the amount of raising of the temperature of the exhaust gases of said diesel internal combustion engine 1 to purge and rejuvenate the soot particle catcher 5; however, also, the greater is the amount of depression (i.e. the lower is the absolute pressure value) in the part of the intake manifold 2 which is downstream of said intake throttling valve 8, as will be seen hereinafter.

As stated earlier, the appropriate supply of actuating electrical energy to the electrically actuated two way switching valve 17, i.e. the supply of a pulsating electrical signal of the appropriate duty ratio to said electrically actuated two way switching valve 17, is made by the electrical control device 19, based upon the values of certain input signals which it receives. In any case, this elctrical control device 19 continuously receives various signals from the internal combustion engine 1 and possibly from other sources representative of various vehicle operational parameters. For example, some of these vehicle operational parameters may be engine load, engine revolution speed, engine cooling water temperature, exhaust gas pressure, and exhaust gas temperature. In the shown preferred embodiment, two of these signals are engine load and engine revolution speed, and signals indicative of the values of these engine operational parameters are dispatched to the electrical control device 19 by, respectively, an engine load sensor 20 and an engine revolution speed sensor 21, both of which are fitted, in the shown construction, to the fuel injection pump 7. No particular means are shown in the figure or further discussed here for provision of the others of these signals, because such means are per se well known and conventional, in various different forms. The electrical control device 19, thus, receives signals representative of these various different vehicle operational parameters, and based upon the values of these signals and possibly upon other factors makes a decision as to whether the soot particle catcher 5 should be purged and rejuvenated at the current time, or not. The algorithm according to which this is done will not particularly be explained herein, because it is not directly relevant to the present invention.

If according to this algorithm the electrical control device 19 judges that more than a specified amount of combustible particles, i.e. soot, has not been caught by the soot particle catcher 5, which accordingly does not require to be purged at the current time, then said electrical control device 19 provides a pulse signal to the electrically actuated two way switching valve 17 of zero duty ratio, in other words provides a continuously OFF electrical signal to said electrically actuated two way switching valve 17. In this operational state, the port "a" of the electrically actuated two way switching valve 17 is continuously communicated to the port "c" thereof, so that air at atmospheric pressure is allowed to pass freely into the diaphragm chamber 13 of the diaphragm device 14, and according to this, as explained earlier, the compression coil spring 14 located within said diaphragm chamber 13 of the diaphragm 12 and the actuating rod 11 and the lever arm 9 attached thereto in the leftward direction as seen in the figure, so as to position the valve shaft 8a and the air throttle butterfly valve 8 attached thereto to their most clockwise rotated positions as seen in the figure, in which no substantial throttling is provided for the intake manifold 2 by the air throttle valve 8. In this operational state, the temperature of the exhaust gases of the diesel internal combustion engine 1 is not substantially raised by intake throttling, and the temperature of these exhaust gases is not particularly expected to be high enough to provide any definite purging or rejuvenation for the soot particle catcher 5. Accordingly deliberate purging and rejuvenation of the soot particle catcher 5 is not performed, in this operational state.

On the other hand, if according to the above mentioned algorithm—again the processes by which this decision is made, and the data on which this decision is based, will not be described herein because they may be of per se well known and conventional sorts—the electrical control device 19 judges that more than said specified amount of combustible particles, i.e. soot, has been caught (presumably over quite a long period of time) by the soot particle catcher 5, which accordingly requires to be purged at this time, and if the electrical control device 19 further judges that, according to other criteria such as for example whether the current operational condition of the internal combustion engine 1 is within a range which is appropriate for purging or rejuvenating the soot particle catcher 5, then said soot catcher 5 should be purged or rejuvenated; and so said control device 19 provides an electrical pulse signal to the electrically actuated two way switching valve 17 of an appropriate pulse duty ratio which is determined as will hereinafter be explained and which is in general non zero. In this operational state, as explained above, the port "a" of the electrically actuated two way switching valve 17 is alternatingly communicated to the port "b" thereof and to the port "c" thereof, so that a vacuum of a vacuum value determined by the duty ratio of the aforesaid pulse signal supplied by the electrical control device 19 is fed to the diaphragm chamber 13 of the diaphragm device 14, and according to this, as also explained earlier, the compression coil spring 14 located within said diaphragm chamber 13 biases the diaphragm 12 and the actuating rod 11 and the lever arm 9 attached thereto somewhat in the rightward direction as seen in the figure, so as to position the valve shaft 8a and the air throttle butterfly valve 8 attached thereto to positions somewhat counterclockwise of their most clockwise positions which are shown in the figure, so as to provide a degree of substantial throttling for the intake manifold 2 by the air throttle valve 8, the degree of this throttling being again determined by the duty ratio of the aforesaid pulse signal supplied by the electrical control device 19. In this operational state, the temperature of the exhaust gases of the diesel internal combustion engine 1 is substantially raised, and the diesel internal combustion engine 1 functions in its particle catcher rejuvenating operational mode, in which the temperature of the exhaust gases of said diesel internal combustion engine 1 is high enough to provide definite purging or rejuvenation for the particle catcher 5. As explained previously, this increase of the temperature of the exhaust gases is obtained because a lesser admixture of atmospheric air is present therein; in other words, although still sufficient air is admitted into the combustion chambers of the diesel internal combustion engine 1 to combust all the fuel injected into said combustion chambers with some air left over—i.e. excess air is still supplied to said diesel internal combustion engine 1 and is still accordingly present in said exhaust gases thereof—nevertheless, because less of such excess air is thus admitted into the combustion chambers through the intake manifold 2 at this time, accordingly less dilution of the combustion products produced in said combustion chambers (said combustion products being hot due to the combustion process) with excess air (which is cold) is performed. This high temperature for the exhaust gases is, in practice, (providing the engine is in its said operational region required for the electrical control device 19 for regenerating the soot particle catcher, outlined above, to perform its function of initiating soot particle catcher rejuvenation) quite adequate to purge or rejuvenate the soot particle catcher 5 by combusting the combustible particles such as soot which have become lodged and accumulated therein.

During this operational mode for rejuvenating the particle catcher, because as explained above the valve shaft 8a and the air throttle butterfly valve 8 attached thereto are positioned by the diaphragm device 10 to their positions in which substantial throttling is provided for the intake manifold 2 by the air throttle valve 8, a substantial depression below atmospheric pressure is present in the intake manifold 2 at points therein downstream of said air throttle valve 8. It is essential for the present invention that the electrical control device 19 should have information indicative of the actual value of this depression or negative pressure within the intake manifold 2 downstream of the air throttling valve 8. In the shown preferred embodiment of the intake air throttle valve control method according to the present invention, this information is dispatched to the electrical control device 19 by a per se well known intake air pressure sensor 27 which senses the pressure of the air which is being sucked into the combustion chambers of the diesel internal combustion engine 1 through the intake manifold 2 at a point of said intake manifold 2 which is downstream of the air throttling valve 8, and which outputs an electrical signal indicative of said pressure.

In general, the functioning of the electrical control device 19 is so to control the air intake throttling valve 8 as to maintain this depression or vacuum value in the intake manifold 2 downstream of said air intake throttling valve 8 at a specified predetermined value, for example about 530 mm Hg absolute, which is the characteristic value relating to this particular diesel internal combustion engine which is approximately the minimum pressure value for the air which is being supplied to the combustion chambers thereof for ensuring that misfiring and poor running of the diesel internal combustion engine 1 will not occur, along with ensuring that quantities of black smoke will not be emitted in the exhaust of the diesel internal combustion engine 1. The details of this control process will now be explained.

Figure 3:
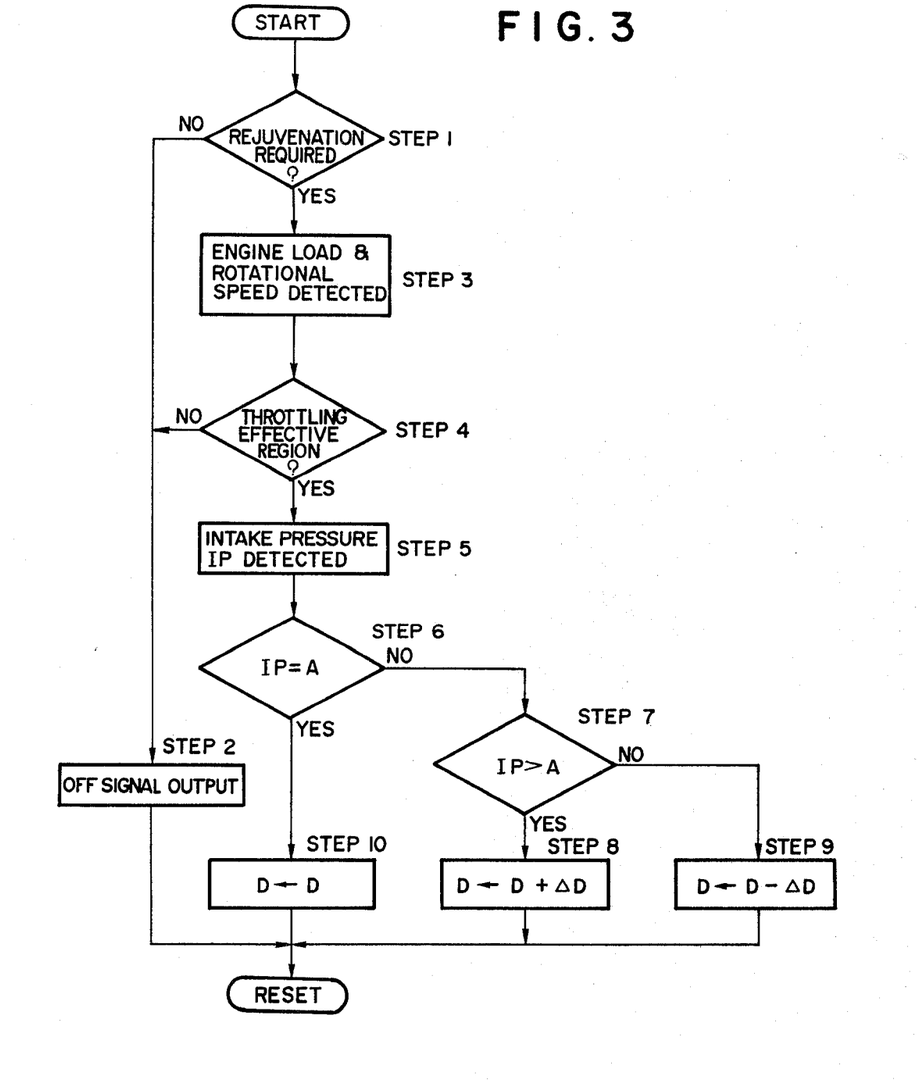
FIG. 3 is a flow chart of a computer program which is followed by a computer incorporated in an electrical control device which controls the air throttling valve of the diesel engine shown in FIGS. 1 and 2.

In the following, the function of the electrical control device 19 will be described, as it is comprised in the functioning of the shown preferred embodiment of the intake air throttle valve control system according to the present invention, for practicing the preferred embodiment of the intake air throttle valve control method according to the present invention. No particular internal structure will be described for this electrical control device 19, because, based upon the description of the function thereof given herein, and based upon various forms of prior art electrical control device for various prior art control systems, various possible structures for such an electrical control device 19 can easily be conceived of by one of ordinary skill in the relevant art. For example, the electrical control device 19 may comprise a microcomputer with various programs stored in the memory thereof, as is the case in the shown preferred embodiment, and may further comprise various analog to digital and digital to analog converters of per se well known sorts which interface between the above described sensors and said microcomputer, and between said microcomputer and said electrically actuated two way switching valve 17 (to produce said pulse signal for feeding to the solenoid thereof, for instance); and the intimate details of the control programs for such a microcomputer will be easily conceived of by one of ordinary skill in the microprogramming art, based upon the functional disclosures relating to the overall control function of the electrical control device 19 contained in this specification, and based upon the flow chart of the program used in the microcomputer included in the electrical control device 19 of this preferred embodiment which is shown in FIG. 3, which will be used for explanation in what follows. Alternatively, the electrical control device 19 may comprise various specialized electronic circuits for performing the functions explained herein and quite possibly other functions which are per se well known; and, again, the details of such specialized electronic circuits will be easily conceived of by one of ordinary skill in the art, based upon the functional disclosures in this specification.

The routine for the microcomputer included in the electrical control device 19 which is shown in FIG. 3 is performed repeatedly during the operation of the diesel internal combustion engine 1, for example every time a fixed time period has elapsed, or alternatively whenever the crankshaft rotates through a particular rotational angle. First, then, when this routine is entered via the START box, the electrical control device 19 determines whether in fact rejuvenation or purging of the soot particle catcher 5 should be performed at this time. The way in which the electrical control device 19 does this will not be particularly discussed herein. With reference to the flow chart of FIG. 3, this process is performed in STEP 1. If the soot particle catcher 5 is not particularly required to be rejuvenated or purged at this time, then, with reference to the flow chart, control passes to STEP 2 in which the electrical control device 19 is caused to output an OFF signal to the electrically actuated two way switching valve 1, i.e. a signal of zero duty ratio in order to provide no substantial throttling for the intake manifold 2 by the air intake throttle valve 8, and then the routine is concluded.

Figure 2:
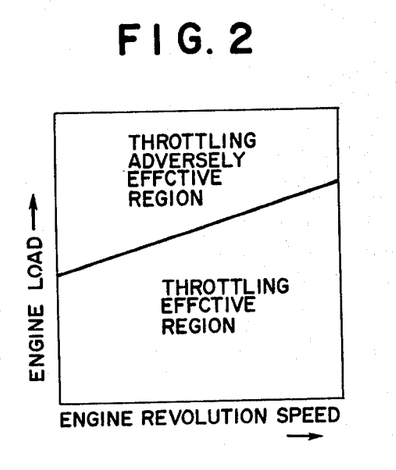
FIG. 2 is a chart, in which engine load is shown in the vertical direction and engine revolution speed is shown in the horizontal direction, illustrating the division of the phase space generated by these two engine operational parameters into two engine operational regions: one engine operational region in which intake throttling for the diesel engine shown in FIG. 1 may be effectively performed if required in order to purge and regenerate the soot particle catcher without adversely affecting engine operation, and another engine operational region in which intake throttling for the diesel engine shown in FIG. 1, if performed in order to purge and regenerate the soot particle catcher, will adversely affect engine operation.

On the other hand, if in STEP 1 it is decided that the soot particle catcher 5 is required to be rejuvenated or purged at this time, then, with reference to the flow chart, control passes to STEP 3. In this step, it has now already been ascertained that it would be desirable to rejuvenate or purge the soot particle catcher 5; but it remains to be determined whether the diesel internal combustion engine 1 is in an operational condition in which this rejuvenation or purging can be properly done. Therefore, in this STEP 3, the electrical control device 19 tests the current values of various operational parameters of the diesel internal combustion engine 1, and makes this decision. In the shown preferred embodiment, in fact, the electrical control device 19 tests the current value of engine load and engine revolution speed, as indicated by the electrical signals indicative of the values of these engine operational parameters which are dispatched to the electrical control device 19 by, respectively, the engine load sensor 20 and the engine revolution speed sensor 21, both fitted, in the shown construction, to the fuel injection pump 7. Then the electrical control device 19 determines whether the point on the phase space generated by these two engine operational parameters which corresponds to the current operational state of the diesel internal combustion engine 1 lies in the one or the other of two engine operational regions: a first engine operational region in which intake throttling for the diesel engine 1 may be effectively performed if required in order to purge and regenerate the soot particle catcher 5 without adversely affecting engine operation, and a second engine operational region in which intake throttling for the diesel engine 1, if performed in order to purge and regenerate the soot particle catcher 5, will adversely affect engine operation. This phase space is shown in FIG. 2, along with the division of said phase space into these two operational regions.

After this determination, then, in STEP 4 of the flow chart shown in FIG. 3, the flow of control in the electrical control device 19 branches, according as said point in the phase space generated by engine load and engine revolution speed representing the current values of said two parameters is in the first or the second engine operational region; i.e. according as it is proper or is not proper to perform rejuvenation and purging of the soot particle catcher 5 at this time. If in fact it is proper to perform rejuvenation and purging of the soot particle catcher 5 at this time, then control passes to STEP 5; if on the other hand it is not proper to perform rejuvenation and purging of the soot particle catcher 5 at this time, then control passes to STEP 2, as before, in which the electrical control device 19 is caused to output an OFF signal to the electrically actuated two way switching valve 1, i.e. a signal of zero duty ratio, in order to provide no substantial throttling for the intake manifold 2 by the air intake throttle valve 8, as before, and then the routine is concluded.

In STEP 5, since it is now decided that the soot particle catcher 5 should definitely be purged or regenerated at this time, the value of the pressure or depression in the intake manifold 2 downstream of the intake air throttling valve 8 is read in and considered, as it is sensed via the electrical signal from the sensor 27. This value is designated in the flow chart of FIG. 3 by the symbol "IP". Of course, in fact, at this stage the process of throttling of the intake manifold 2 by the intake air throttling valve 8 may already be being performed.

Next, control passes to the decision boxes shown in STEP 6 of the flow chart of FIG. 3.

In detail, in what follows the symbol "A" is used to represent a target or reference value for the pressure in the intake manifold 2 downstream of the intake air throttling valve 8, and the symbol "D" is used to represent the duty ratio of the pulse signal which is fed by the electrical control device 19 to the electrically actuated two way switching valve 17 in order to control it to provide a certain amount of throttling for the intake manifold 2 by the intake air throttling valve 8.

Now, in STEP 6 it is tested as to whether the actual value IP of said value of the pressure or depression in the intake manifold 2 downstream of the intake air throttling valve 8 is equal to said target value A for said pressure, or not. If IP is equal to A, then no adjustment of the duty ratio D of the pulse signal which is fed by the electrical control device 19 to the electrically actuated two way switching valve 17 is required, and accordingly control passes to STEP 10 in which the value of this duty ratio D is not altered, and from which step the routine terminates. Of course the equality herein is a matter of a certain predetermined range of approximation within which IP is deemed to be at the target value of A and no adjustment of IP is practically necessary. On the other hand, if IP is not equal to A, i.e. IP is different from A beyond a certain predetermined range of approximation, then some adjustment of the duty ratio D of the pulse signal which is fed by the electrical control device 19 to the electrically actuated two way switching valve 17, either up or down, is required, and accordingly control passes to STEP 7 in which the direction of this adjustment of this duty ratio D is determined.

In this STEP 7, it is tested as to whether the actual value IP of said value of the pressure or depression in the intake manifold 2 downstream of the intake air throttling valve 8 is greater than said target A for said pressure, or on the contrary is less than said target value A (it cannot be equal, at this point in the flow chart, obviously). If IP is greater than A, (taking IP to represent absolute pressure, so that the depression in the intake manifold 2 downstream of the intake air throttling valve 8 is not as great as the maximum or target amount), then some adjustment of the duty ratio D of the pulse signal which is fed by the electrical control device 19 to the electrically actuated two way switching valve 17 in the upwards direction so as to increase the amount of throttling provided for the intake manifold 2 by the intake air throttling valve 8 is required, and accordingly control passes to STEP 8 in which the value D is increased by a relatively small amount delta-D, and from which the operation of the routine terminates. On the other hand, if IP is less than A, so that the depression in the intake manifold 2 downstream of the intake air throttling valve 8 is greater than the maximum or target amount, then some adjustment of the duty ratio D of the pulse signal which is fed by the electrical control device 19 to the electrically actuated two way switching valve 17 in the downwards direction so as to decrease the amount of throttling provided for the intake manifold 2 by the intake air throttling valve 8 is required, and accordingly control passes to STEP 9 in which the value of D is decreased by the same relatively small amount delta-D, and from which the operation of the routine terminates.

It will be understood from the above explanation that the opening amount of the intake air throttle valve 8 is controlled in a feedback manner, with the objective of keeping the amount of depression at the point in the intake manifold 2 at which the sensor 27 is fitted, which is downstream of the intake air throttle valve 8, substantially at or near the predetermined target or reference value A. By doing this, said control device keeps said pressure at said point in said intake manifold 2 downstream of said intake throttle valve 8 substantially at said predetermined target pressure, which should be approximately the minimum pressure in the intake manifold at which it can be relied upon that the diesel internal combustion engine 1 will not misfire, emit quantities of noxious black smoke, or suffer from poor drivability, and which should be effective to rejuvenate and purge the soot particle catcher 5 with high efficiency. Accordingly the danger of reducing the breathing ability of the diesel internal combustion engine 1 to below the safe level, and of consequent loss of performance and power thereof, is positively avoided. Thus the drivability of a vehicle including the diesel internal combustion engine 1 is promoted, and the quality of its exhaust emissions during rejuvenation of the soot particle catcher 5 is enhanced.

Although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawings, but solely by the scope of the appended claims, which follow.

What is claimed is:

1. In a diesel internal combustion engine including an exhaust system having a soot particle catcher, an intake manifold and an air throttle valve positioned in said intake manifold for throttling the flow of air through said manifold and for raising the temperature of exhaust gases flowing through said exhaust system to purge said soot particle catcher by incineration, a method comprising repeatedly performing the steps of:

measuring engine load;

measuring engine revolution speed;

determining, based upon the measured engine load and revolution speed, when the engine is operating in a first operational condition which allows for intake throttling for purging of said soot particle catcher and when said engine is operating in a second operating condition which does not allow for intake throttling for purging of said soot particle catcher;

measuring the pressure in said intake manifold at a point downstream of said intake throttle valve;

only when said engine is operating in said first operating condition, controlling the opening of said throttle valve as a function of said measured pressure so as to bring the pressure measured at said point in said intake manifold to a predetermined target pressure value.

2. The method of claim 1 wherein the control of the opening of said throttle valve is performed in correspondence with a pulse signal proportional to a duty ratio, said duty ratio being stepwise increased when the measured pressure is higher than said target pressure value and being stepwise decreased when said measured pressure is lower than said target pressure value.

3. In a diesel internal combustion engine including an exhaust system having a soot particle catcher, an intake manifold for throttling the positioned in said intake manifold for throttling the flow of air through said intake manifold and for raising the temperature of exhaust gases flowing through said exhaust system to purge said soot particle catcher by incineration, a system for controlling said throttle valve, said system comprising:

(a) an engine load sensor which responds to the load of the engine and outputs an engine load electrical signal representative of the load of the engine;

(b) an engine revolution speed sensor which responds to the rotational speed of the engine and outputs an engine rotational speed electrical signal representative of the rotational speed of the engine;

(c) a pressure sensor which responds to the pressure of intake air in said intake manifold at a point downstream of said intake throttle valve and outputs an intake air pressure electrical signal representative of the pressure of the intake air at said point;

(d) an electric computer connected to said engine load sensor for receiving said engine load electrical signal, connected to said engine revolution speed sensor for receiving said engine revolution speed signal, connected to said pressure sensor for receiving said pressure electrical signal, and connected to said throttle valve for controlling the position of said throttle valve, said computer including means to control said throttle valve as function of the following repeated sequence:

(d1) determining, based upon said engine load electrical signal and said engine revolution speed electrical signal, when the engine is operating in a first operation condition which allows for intake throttling and when the engine is operating in a second operation condition which does not allow for intake throttling, (d2) comparing said intake air pressure electrical signal with a predetermined target pressure electrical value when said engine is operating in said first operating condition, (d3) generating a pulse electrical signal based upon a constant value duty ratio when said intake air pressure electrical signal is equal to said target pressure electrical value, (d4) generating a pulse electrical signal based upon an increased value duty ratio when the intake air pressure electrical signal is larger than the target pressure electrical value.

(d5) generating a pulse electrical signal based upon a reduced value duty ratio when the intake air pressure electrical signal is less than the predetermined target pressure electrical value; and (e) means connected to said computer for closing said throttle valve as a function of the pulse electrical signal.

* * * * *